July 2, 1968   J. A. WEISBECKER   3,390,472
COMPUTER-TYPE TEACHING AND AMUSEMENT DEVICE
Filed March 7, 1966   4 Sheets-Sheet 1
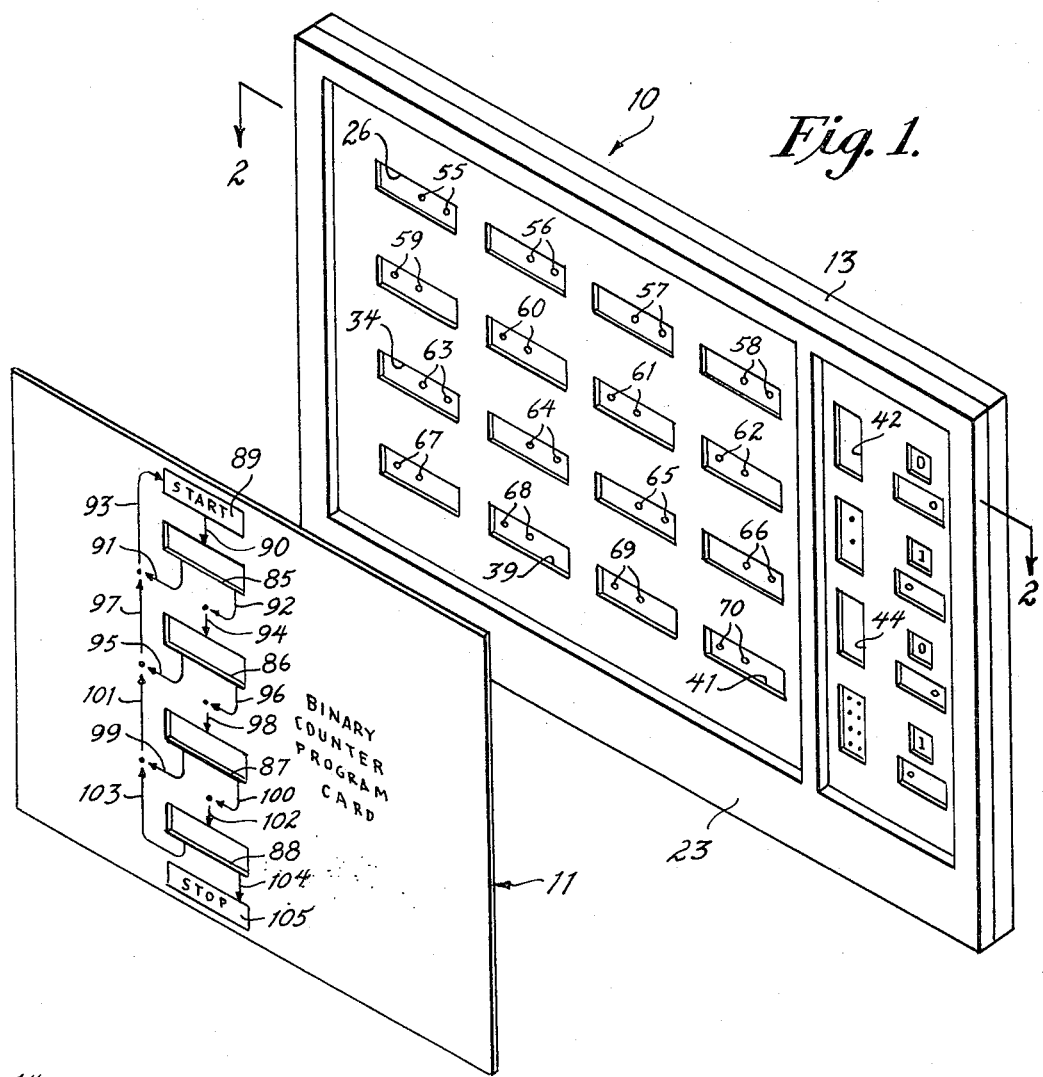
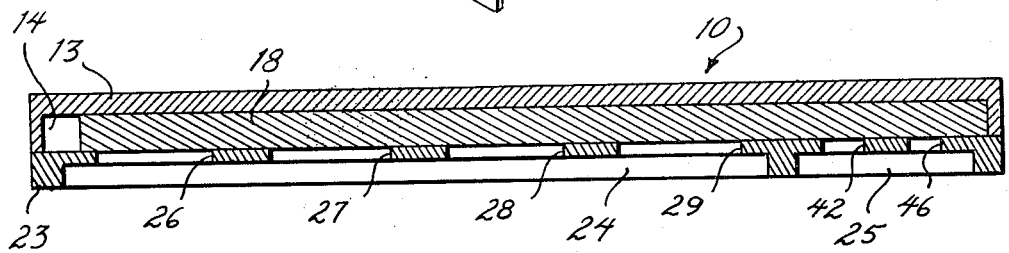
INVENTOR.
JOSEPH A. WEISBECKER
BY Robert K. Youtie
ATTORNEY.

INVENTOR.
JOSEPH A. WEISBECKER
BY Robert K. Koutis
ATTORNEY.

July 2, 1968     J. A. WEISBECKER     3,390,472
COMPUTER-TYPE TEACHING AND AMUSEMENT DEVICE
Filed March 7, 1966     4 Sheets-Sheet 3

INVENTOR.
JOSEPH A. WEISBECKER
BY Robert K. Youtie
ATTORNEY.

July 2, 1968  J. A. WEISBECKER  3,390,472
COMPUTER-TYPE TEACHING AND AMUSEMENT DEVICE
Filed March 7, 1966  4 Sheets-Sheet 4

INVENTOR.
JOSEPH A. WEISBECKER
BY Robert K. Youtie
ATTORNEY.

United States Patent Office 3,390,472
Patented July 2, 1968

3,390,472
COMPUTER-TYPE TEACHING AND
AMUSEMENT DEVICE
Joseph A. Weisbecker, 1220 Wayne Ave.,
Erlton, Cherry Hill, N.J. 08034
Filed Mar. 7, 1966, Ser. No. 532,333
4 Claims. (Cl. 35—30)

ABSTRACT OF THE DISCLOSURE

This invention is concerned essentially with a computer-type teaching and amusement device wherein a series of operating elements are carried by a mounting structure and each manually shiftable between a pair of alternate positions, the operating elements being at least partially exposed for visually identifying the respective positions, together with indicia means carried by the mounting structure and cooperating with the operating elements to indicate the sequence of movement of the latter.

---

This invention relates generally to a combination teaching and amusement device, and is especially concerned with a binary-computer-type mechanism for such device.

It is an important object of the present invention to provide a combination computer-type teaching and amusement device which serves to instruct in the elements of binary logic and computer operation.

It is another object of the present invention to provide a device of the type described which is capable of providing amusement in the form of puzzles and games of a wide variety.

It is still another object of the present invention to provide a device having the advantageous characteristics mentioned in the preceding paragraphs which is extremely simple in construction, entirely reliable in operation, requiring a minimum of parts, and which accurately simulates binary-computer operation for use in instruction and for amusement appealing to a wide range of users.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

FIGURE 1 is an exploded front perspective view showing a computer-type device of the present invention and illustrating in exploded relation therewith an indicia-carrying overlay for use with the device;

FIGURE 2 is a horizontal sectional view taken generally along the line 2—2 of FIGURE 1;

Referring now more particularly to the drawings, and specifically to FIGURE 1 thereof, a computer-type device is there generally designated 10, and may be employed in conjunction with a program card 11 carrying appropriate indicia means.

Figure 3:
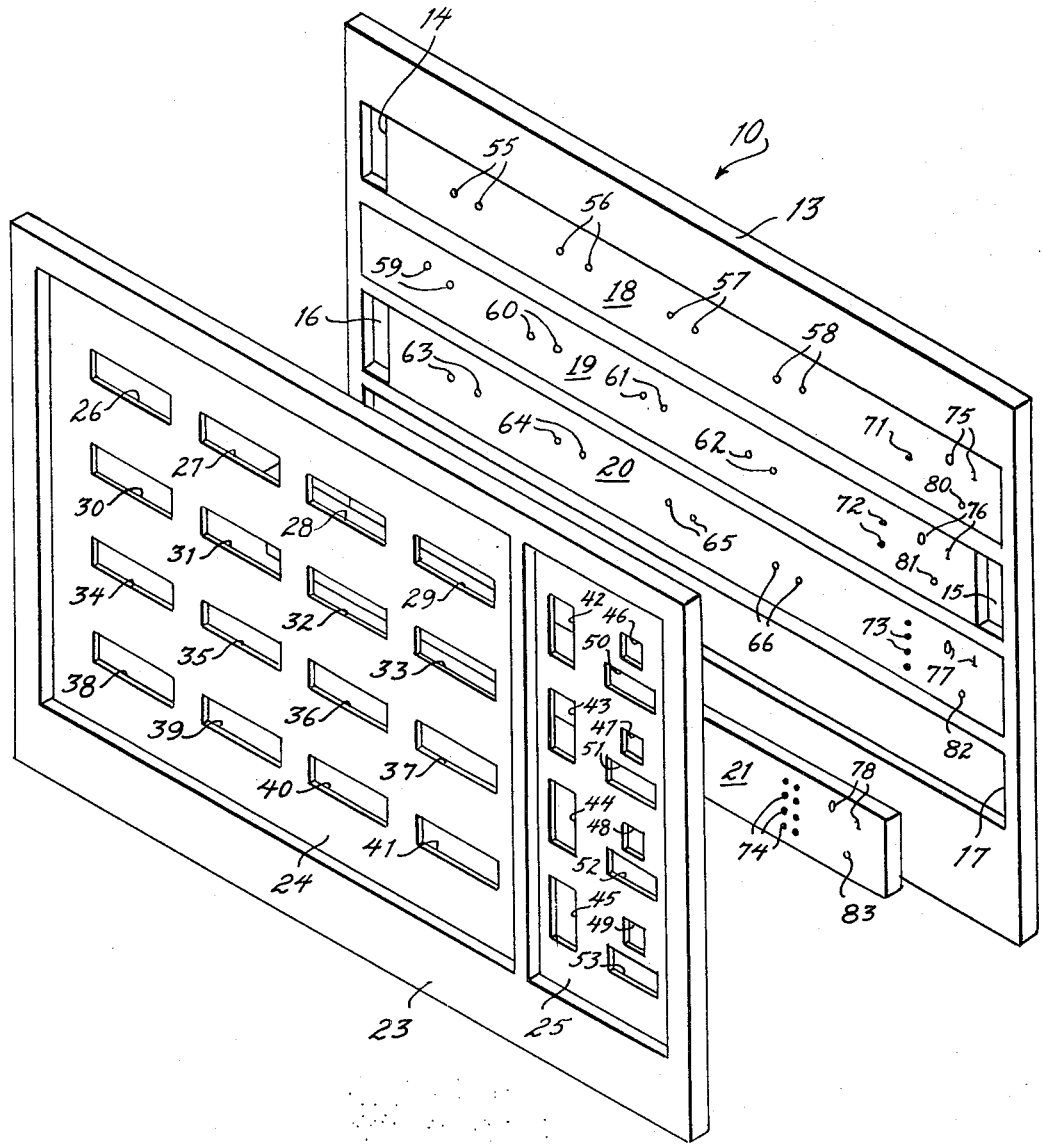
FIGURE 3 is an exploded front perspective view showing component parts of the computer device of FIGURES 1 and 2.

The device 10 is best seen in FIGURES 2 and 3 as including a generally flat, substantially rectangular body or housing 13, which may be a substantially flat plate of plastic or other suitable material. On the forward side of the housing or plate 13 there are formed therein a series or row of laterally extending, generally parallel and longitudinally coextensive grooves or recesses 14, 15, 16 and 17. The grooves or recesses 14–17 are so designated for convenience only as from top to bottom. As will appear presently there may be greater or lesser number of grooves or recesses 14–17, which recesses serve to define slideways.

A plurality of elongate barlike operating elements or slides 18, 19, 20 and 21 are respectively slidably received in slideways 14, 15, 16 and 17. The slides 18–21 are each of elongate configuration slidably conformably engageable in its respective slideway, and of a length slightly less than the respective slideway for limited longitudinal sliding movement therein. In practice, the slides 18–21 are movable between alternate positions adjacent to opposite ends of their respective slideways 14–17, and may be frictionally retained in the alternate positions, or otherwise suitably retained, as by spring detents, or other means. In the condition shown in FIGURE 3, the uppermost operating element or slide 18 has been shifted to its rightward position, the next lower operating element or slide 19 having been shifted to its leftward position, and the next lower slide or operating element 20 having been shifted to its rightward position. The lowermost slide or operating element 21 is illustrated in FIGURE 2 as having been removed from its slideway 17.

The operating elements or slides 18–21 may be substantially flush with the forward surface of backplate or housing 13, as illustrated, or otherwise if desired.

Arranged in covering relation with the housing 13 and its received slides or operating elements is a cover or front panel 23. The cover is of an outline configuration generally congruent to that of the housing 13 and may be formed on its forward surface with a pair of recesses 24 and 25. The recesses 24 and 25 may be of generally rectangular configuration, the former occupying a major part of the front panel 23 spaced within the bounding edges thereof, and the latter recess 25 occupying substantially the remainder of the front panel, being spaced from the bounding edges thereof and the recess 24.

Formed in the recess 24 of front wall or cover 23, directly in front of the upper operating element 18 is a row of access openings or windows 26–29. The row of windows 26–29 are arranged longitudinally along and in front of the operating element 18 for exposing longitudinally spaced regions of the latter operating element. Similarly, a row of openings or windows 30, 31, 32 and 33 are formed in the recess 24 of front panel 23 at longitudinally spaced locations along and directly in front of the operating element 19. An additional row of thru openings or windows 34–37 is formed in the recess 24 at longitudinally spaced locations along the operating element 20, and an additional row of openings or windows 38–41 is formed through the recess 24 along and directly in front of the lowermost operating element 21, when the latter is in its receiving slideway 17. While each window row includes four windows, this number may be greater or less, as desired. Also, it will be appreciated that the several rows of windows are arranged in alignment with each other transversely of the slideways 14–17, to define transverse or vertical rows of windows, and further the windows are regularly arranged to define diagonal window rows.

Formed through the front wall 23 in recess 25 is a vertical series of openings or windows 42, 43, 44 and 45, respectively arranged in alignment with the above-described horizontal rows of windows. Thus, the upper window 42 exposes a portion of upper operating element 18, the next-lower window 43 exposing a portion of the next-lower operating element 19, the window 44 exposing a portion of operating element 20, and the lowermost window 45 exposing a portion of lowermost operating element 21. Located alongside of respective windows 42, 43, 44 and 45 are an additional vertically arranged series of windows 46, 47, 48 and 49. The windows 46–49 are respectively directly in front of operating elements 18–21 for exposing portions thereof. Similarly, directly below respective windows 46–49, and also alongside of respective windows 42–45 are an additional array of thru openings or windows 50, 51, 52 and 53, respectively located in front and exposing portions of operating elements 18, 19, 20 and 21.

In the assembled condition of FIGURES 1 and 2, the cover 23 is secured by any suitable means in front of the backplate 13, with the operating elements 18–21 slidably received in their respective slideways 14–17.

The slides or operating elements 18–21 are provided with indicia or markings visible through the several openings or windows of cover member 23. In particular, the slide 18 is provided with several sets or pairs of markings, such as holes 55, 56, 57 and 58 respectively located for exposure through windows 26, 27, 28 and 29 for ascertaining the position of operating element 18. The operating element 19 is similarly provided with sets or pairs of markings or holes 59, 60, 61 and 62 respectively exposed through windows 30, 31, 32 and 33; the operating element 20 being provided with sets or pairs of markings or holes 63, 64, 65 and 66 for exposure through respective windows 34, 35, 36 and 37, and the operating element 21 being provided with sets or pairs of markings or holes 67, 68, 69 and 70 respectively exposed through windows 38, 39, 40 and 41.

Read-out indicia are provided on the operating elements 18–21, say in the nature of a single marking or dot 71 on operating element 18, a double dot or marking 72 on operating element 19, a quadruple marking or dots 73 on operating element 20, and octuple markings or dots 74 on operating element 21. The read-out markings 71, 72, 73 and 74 are shiftable with their respective operating elements between exposed conditions, being respectively revealed through windows 42, 43, 44 and 45, and concealed conditions behind the front panel. In the illustrated embodiment, the read-out markings 71–74 are concealed in the rightward position of movement of the operating elements, and exposed when the operating elements are shifted to their leftward position.

In addition, condition indicia are provided on each operating element 18–21, which may be the numerals "0" and "1" consistent with binary-logic practice. The condition indicia are respectively designated 75, 76, 77 and 78 on the operating elements 18, 19, 20 and 21 and located for shifting movement therewith between positions alternately exposing the numerals "0" and "1" through respective windows 46, 47, 48 and 49. Thus, as illustrated, a rightward position of each operating element 18–21 is indicated by a "0" condition, and a leftward position thereof by a "1" condition. Below the condition indicia 75, 76, 77 and 78 of the respective operating elements may be provided a marking or hole, as at 80, 81, 82 and 83 respectively exposed through windows 50, 51, 52 and 53 for further indicating the positions of the several operating elements.

While the forward face of front panel or cover 23 may be provided with suitable indicia, if desired, it is found advantageous to employ removable overlays or indicia-carrying sheets or cards, such as at 11 in FIGURE 1. The card there illustrated is marked with indicia having binary-counter programming characteristics, and is advantageously configured for conforming engagement in the front-wall or cover recess 24. Windows are formed in the indicia card or overlay 11, as at 85, 86, 87 and 88 for respective registry with a row of windows of the cover 23. In the illustrated embodiment, the indicia-card windows 85–88 register respectively with the windows 27, 31, 35 and 39 of the cover 23. In this manner, the operating-element markings 56, 60, 64 and 68 are exposed through the indicia card for indicating the positions of the respective elements. Further, the indicia-carrying card 11 is provided with directional markings indicating the path of informational flow. In particular, a "Start" area is designated 89 and located at an upper region of the card 11 spaced over the vertically aligned windows 85–88. Depending laterally centrally from the start area 89 is a directional marking or arrow 90 to the window 85. Depending from left- and right-hand regions of the window 85 are a pair of directional markings or arrows 91 and 92, the former extending leftward beyond the vertical row of windows, and the latter extending leftward to a laterally medial terminus. From the end of arrow 91 an additional arrow 93 extends upward to the start area 89, while a laterally central arrow 94 depends from the terminus of arrow 92 to the window 86. A similar pair of laterally spaced arrows 95 and 96 depend from window 86, the former extending leftward beyond the vertical row of windows and the latter extending leftward to a terminus laterally medially of the windows. A directional marking or arrow 97 extends from the terminus of arrow 95 to the origin of arrow 93. Depending laterally medially of the vertical row of windows 85–88 from the terminus of arrow 96 is an arrow 98 terminating at the window 87.

An additional pair of laterally spaced arrows 99 and 100 depend from the window 87, the former extending leftward beyond the vertical row of windows, and the latter extending leftward to a terminus laterally medially of the vertical row of windows. A directional marking or arrow 101 extends from the terminus of arrow 99 to the origin of arrow 97, and a directional marking or arrow 102 depends, laterally medially of the vertical row of windows from the terminus of arrow 100 to the window 88. From the underside of window 88 depend a pair of laterally spaced arrows 103 and 104, the former extending to the origin of arrow 101, and the latter depending to a lowermost area 105 designated "Stop." With the card 11 in position within the recess 24, it is only necessary for an operator to follow the directions of arrows indicated for the device 10 to perform a counting operation in the manner of a binary computer.

For example, in the condition of the device 10 as shown in FIGURE 1, the numerical read-out is ten the sum of read-out indicia 72 and 74. This is the decimal equivalent of the binary count 1010, as shown by indicia 78, 77, 76 and 75, read upwardly. With the card 11 in position in the recess 24 of the device 10, as shown in FIGURE 1, and following the directional markings or arrows, an operator moves, as by a stylus or other implement, from the start area 89 downwardly along the arrow 90 to the leftward hole 56, which is centrally located in window 85. The leftward hole 56 can only move leftward, from which the stylus is moved along arrows 91 and 93, back to "Start." The resulting condition shifts read-out indicia 71 into view through window 42 for a decimal read-out of eleven, and the binary read-out 75 is shifted to present a binary count of 1011.

Binary-counter operation is illustrated in greater detail in the sequence of FIGURES 4A, 4B, 4C and 4D. It will there be apparent from an initial condition shown in FIGURE 4A of decimal read-out seven, operation as required by the directional markings of overlay or indicia card 11 produces the successive conditions of FIGURES 4B, 4C and 4D, which illustrate successive read-outs of successive binary counts and decimal equivalents.

Figure 4A:
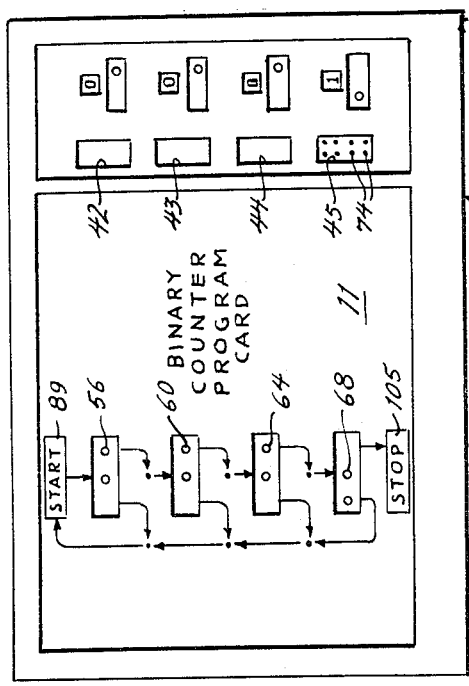
FIGURES 4A, 4B, 4C and 4D illustrate successive steps in performing a binary-computer operation, namely that of counting.
Figure 4B:
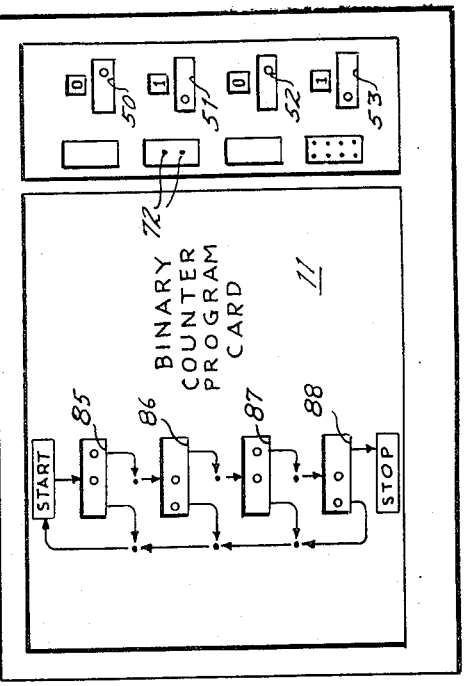
Figure 4C:
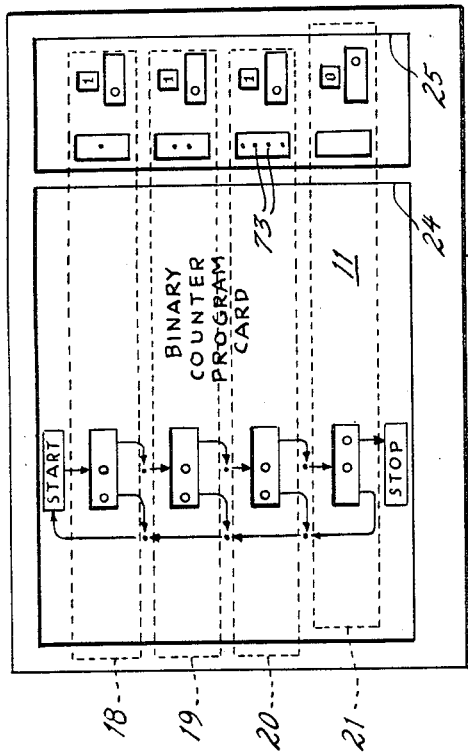
Figure 4D:
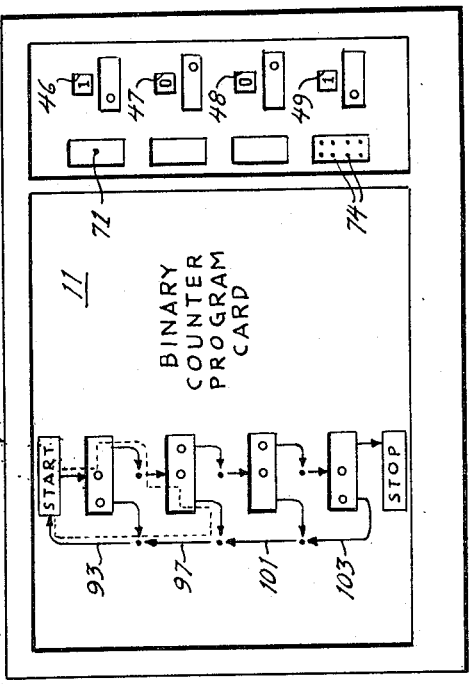

Without belaboring the mechanism of each path of movement, one such path is illustrated in dashed lines in FIGURE 4C, and is believed self-explanatory.

Of course, an extremely large variety of binary-logic networks can be constructed and demonstrated by appropriate programs of indicia-carrying cards, including networks for counting, adding, subtracting, code conversion, comparison, and others. Also, the number of windows and operating elements may be decreased for simplicity, or increased for realization of more complex functions.

Figure 5A:
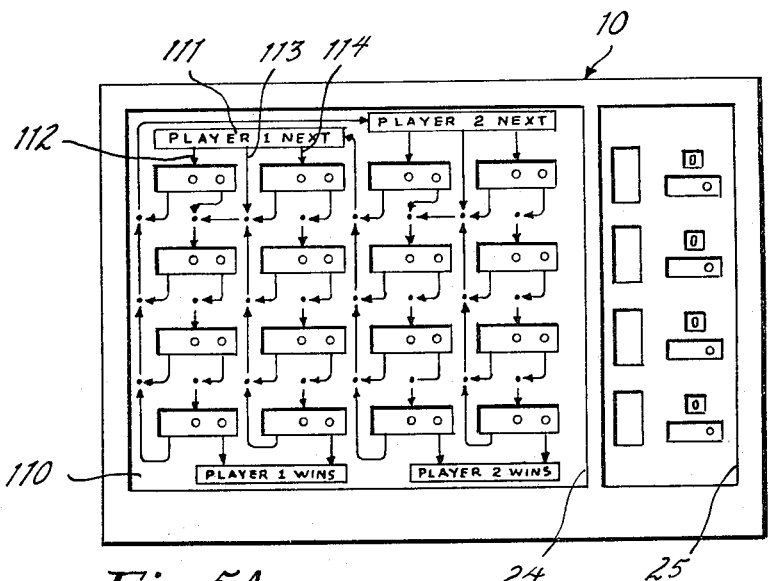
FIGURES 5A and 5B illustrate programming associated with the instant computer-type device for amusement purposes.

Further by way of illustration the device 10 is shown in FIGURE 5 as employed with an indicia-carrying card or program 110, enabling the device to be employed as a game or amusement device. The particular illustrated indicia-carrying card 110 corresponds generally to a game sometimes called "Nim," where players alternate in turn adding to a cumulative sum attempting to achieve or avoid adding up to a predetermined amount. The start of play is illustrated in FIGURE 5A, the operating elements all being set to their rightward positions to expose the "0" conditions. The first player starts from the area 111 designated "PLAYER ONE NEXT" and may follow any one of the three arrows designated 112, 113 and 114 from the starting position. If player one follows arrow 112, then one will be added to the read-out. If arrow 113 is followed, two will be added to the read-out, and if arrow 114 is followed, then three will be added to the read-out. The other player has the same three options, and the first player to achieve a count of sixteen will exit to a "WIN" area.

Figure 5B:
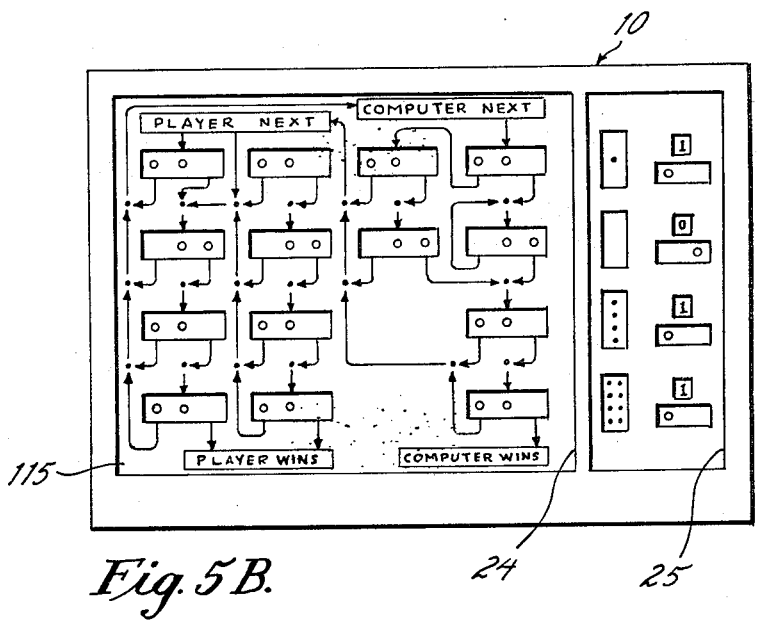

In FIGURE 5B is shown a similar amusement or game employing a card or indicia carrier 115, wherein a single player plays against the device 10, but operates both for his own and for the computer's turn. There is illustrated in FIGURE 5B a typical setting just prior to the computer's last move, where it will be seen that the computer will choose to add three (the binary count 0011 to the existing count of thirteen (the binary count of 1101, to end and win game.

Of course, a wide variety of additional logical puzzles or games can be similarly programmed for the instant device, within the limitations of the number of windows and operating elements provided.

From the foregoing, it is seen that the present invention provides a computer-type teaching and amusement device which fully accomplishes its intended objects and is well adapted to meet practical conditions of manufacture, distribution and use.

Although the present invention has been described in some detail by way of illustration and example for purposes of clarity of understanding, it is understood that certain changes and modifications may be made within the spirit of the invention and scope of the appended claims.

What is claimed is:

1. A computer-type teaching and amusement device comprising a mounting structure, a series of operating elements carried by said mounting structure and each manually selectively shiftable between a pair of alternate positions, said operating elements being at least partially exposed for visually identifying the respective positions thereof, indicia means carried by said mounting structure in corelation with said operating elements to indicate the sequence of movement of said operating elements, numerical read-out indicia on each of said operating elements located for movement therewith upon shifting of the operating elements between their alternate positions, and concealing means configured to expose and conceal said read-out indicia upon shifting to respective alternate positions of said operating elements.

2. A computer-type teaching and amusement device comprising a mounting structure, a series of operating elements carried by said mounting structure and each manually selectively shiftable between a pair of alternate positions, said operating elements being at least partially exposed for visually identifying the respective positions thereof, indicia means carried by said mounting structure in corelation with said operating elements to indicate the sequence of movement of said operating elements, said mounting structure comprising a housing having a plurality of generally parallel slideways respectively slidably receiving said operating elements, and a cover on said housing over said operating elements affording visual access thereto for ascertaining the positions thereof, said cover having a plurality of rows of windows each arranged longitudinally along a respective operating element for exposing different portions thereof, the windows of the several longitudinal rows being in alignment transversely of said operating elements to define transverse and diagonal rows of windows, and said indicia means having directional markings between said windows defining binary-computer paths.

3. A computer-type teaching and amusement device comprising a mounting structure, a series of operating elements carried by said mounting structure and each manually selectively shiftable between a pair of alternate positions, said operating elements being at least partially exposed for visually identifying the respective positions thereof, and indicia means carried by said mounting structure in corelation with said operating elements to indicate the sequence of movement of said operating elements, said indicia means comprising a sheet removably located over said mounting structure and operating elements, said sheet having windows therein affording visual access to said operating elements to ascertain the positions thereof, and said sheet being imprinted with programming material indicating initial positioning of said operating elements.

4. A computer-type teaching and amusement device according to claim 3, in combination with numerical read-out indicia on each of said operating elements located for movement therewith upon shifting of the operating elements between their alternate positions, and concealing means configured to expose and conceal said read-out indicia upon shifting to respective alternate positions of said operating elements.

References Cited
UNITED STATES PATENTS

| | | | |
|---|---|---|---|
| 3,006,082 | 10/1961 | Libbey | 35—32 XR |
| 3,071,320 | 1/1963 | Scott | 35—30 |
| 3,337,970 | 8/1967 | Rachofsky | 35—33 |

EUGENE R. CAPOZIO, *Primary Examiner.*

W. H. GRIEB, *Assistant Examiner.*